(12) United States Patent
Zhang

(10) Patent No.: US 10,948,944 B2
(45) Date of Patent: Mar. 16, 2021

(54) ELECTRONIC DEVICE

(71) Applicant: Lenovo (Beijing) Co., Ltd., Beijing (CN)

(72) Inventor: Xin Zhang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/584,462

(22) Filed: Sep. 26, 2019

(65) Prior Publication Data
US 2020/0103936 A1    Apr. 2, 2020

(30) Foreign Application Priority Data

Sep. 30, 2018   (CN) .......................... 201811161086.0

(51) Int. Cl.
*G06F 1/16*    (2006.01)

(52) U.S. Cl.
CPC .......... *G06F 1/1616* (2013.01); *G06F 1/1643* (2013.01); *G06F 1/1647* (2013.01); *G06F 1/1681* (2013.01); *G06F 1/1684* (2013.01)

(58) Field of Classification Search
CPC ..... G06F 1/1616; G06F 1/1633; G06F 1/1656
See application file for complete search history.

(56) References Cited

U.S. PATENT DOCUMENTS

| | | | | | |
|---|---|---|---|---|---|
| 5,175,672 | A * | 12/1992 | Conner | ................. | G06F 1/1616 235/145 R |
| 5,251,102 | A * | 10/1993 | Kimble | ................. | G06F 1/1616 361/679.09 |
| 5,371,332 | A * | 12/1994 | Baum | .................... | A61C 19/00 200/5 A |
| 5,689,654 | A * | 11/1997 | Kikinis | ................. | G06F 1/1626 345/173 |
| 5,717,431 | A * | 2/1998 | Chia-Ying | ............ | G06F 1/1616 345/168 |
| 5,844,773 | A * | 12/1998 | Malhi | .................... | G01D 11/28 361/679.27 |
| 5,898,600 | A * | 4/1999 | Isashi | .................... | G06F 1/1618 345/169 |
| 6,036,287 | A * | 3/2000 | Kim | ...................... | G06F 1/1616 312/223.2 |
| 6,116,767 | A * | 9/2000 | Chaiken | ................ | G06F 3/0605 345/169 |
| 6,336,614 | B1 * | 1/2002 | Kwitek | ................. | G06F 1/1616 248/118 |
| 6,430,038 | B1 * | 8/2002 | Helot | .................... | G06F 1/1616 248/917 |
| 6,480,373 | B1 * | 11/2002 | Landry | ................. | G06F 1/1616 16/308 |
| 6,687,119 | B2 * | 2/2004 | Lai | ........................ | G06F 1/1616 361/679.09 |

(Continued)

*Primary Examiner* — Adrian S Wilson
(74) *Attorney, Agent, or Firm* — Anova Law Group, PLLC

(57) ABSTRACT

An electronic device is provided. The electronic device includes a main body including a first main body and a second main body, and a connecting device connected to a first side of the first main body and a second side of the second main body such that the first main body and the second main body are movable relative to each other. The main body includes a first portion adjacent to the connecting device and a second portion away from the connecting device. A thickness of the first portion is greater than a thickness of the second portion.

11 Claims, 6 Drawing Sheets

(56) References Cited

U.S. PATENT DOCUMENTS

| | | | | |
|---|---|---|---|---|
| 6,744,623 B2* | 6/2004 | Numano | G06F 1/1632 | 345/87 |
| 6,831,229 B1* | 12/2004 | Maatta | G06F 1/1616 | 174/50 |
| 6,980,423 B2* | 12/2005 | Tanaka | G06F 1/162 | 248/917 |
| 7,353,050 B2* | 4/2008 | Im | H04M 1/022 | 379/433.12 |
| 7,787,914 B2* | 8/2010 | Ahn | H04M 1/022 | 455/575.1 |
| RE43,485 E* | 6/2012 | Hargreaves | D14/393 | |
| 8,208,249 B2* | 6/2012 | Chin | G06F 1/1618 | 361/679.27 |
| 8,310,823 B2* | 11/2012 | Stoltz | G06F 1/1696 | 361/679.17 |
| 8,396,519 B2* | 3/2013 | Christensen | H04M 1/0216 | 455/575.3 |
| 2002/0018027 A1* | 2/2002 | Sugimoto | G06F 1/1616 | 345/1.3 |
| 2005/0073515 A1* | 4/2005 | Kee | G06F 1/1692 | 345/204 |
| 2005/0236869 A1* | 10/2005 | Ka | H04M 1/0237 | 296/192 |
| 2009/0149226 A1* | 6/2009 | Watanabe | H04M 1/022 | 455/575.3 |
| 2010/0277856 A1* | 11/2010 | Stoltz | G06F 1/1669 | 361/679.06 |
| 2014/0160653 A1* | 6/2014 | Wong | G06F 1/1658 | 361/679.08 |
| 2016/0014367 A1* | 1/2016 | Yeo | H04R 1/345 | 348/836 |
| 2017/0262018 A1* | 9/2017 | Kim | G06F 1/263 | |
| 2019/0339738 A1* | 11/2019 | Hou | H04M 1/0268 | |

* cited by examiner

ELECTRONIC DEVICE

CROSS-REFERENCES TO RELATED APPLICATIONS

This application claims priority of Chinese Patent Application No. 201811161086.0, filed on Sep. 30, 2018, the entire content of which is hereby incorporated by reference.

FIELD OF THE DISCLOSURE

The present disclosure generally relates to the field of electronic technologies and, more particularly, relates to an electronic device.

BACKGROUND

With development of electronic technologies, notebook computers have become an indispensable tool because of their portability. FIG. 1 illustrates a notebook computer. As shown in FIG. 1, the notebook computer includes four surfaces A, B, C and D. The surface A and the surface D are outer surfaces of the notebook computer, the surface B is a display screen, and the surface C is an input keyboard. Each of two parts (including a structure including surfaces A and B and a structure including surfaces C and D) of the notebook computer may have a consistent thickness, and the notebook computer may thus have a monotonous external appearance.

The disclosed devices are directed to solve one or more problems set forth above and other problems in the art.

SUMMARY

One aspect of the present disclosure includes an electronic device. The electronic device includes a main body including a first main body and a second main body, and a connecting device connected to a first side of the first main body and a second side of the second main body such that the first main body and the second main body are movable relative to each other. The main body includes a first portion adjacent to the connecting device and a second portion away from the connecting device. A thickness of the first portion is greater than a thickness of the second portion.

Another aspect of the present disclosure includes an electronic device. The electronic device includes a main body including a first main body and a second main body, and a connecting device connected to a first side of the first main body and a second side of the second main body such that the first main body and the second main body are movable relative to each other. The main body includes a first portion, a second portion and a third portion, sequentially arranged in a direction from an end of the main body adjacent to the connecting device to an end of the main body away from the connecting device, and the first portion is adjacent to the connecting device. A thickness of the first portion is greater than a thickness of the second portion, and the thickness of the second portion is greater than a thickness of the third portion. A first distance is between the first portion and the connecting device, a second distance is between the second portion and the connecting device, and a third distance is between the third portion and the connecting device. The first distance is less than the second distance, and the second distance is less than the third distance.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present disclosure more clear and explicit, the present disclosure is described in further detail with accompanying drawings and embodiments. It should be understood that the specific exemplary embodiments described herein are only for explaining the present disclosure and are not intended to limit the present disclosure.

Reference will now be made in detail to exemplary embodiments of the present disclosure, which are illustrated in the accompanying drawings. Wherever possible, the same reference numbers will be used throughout the drawings to refer to the same or like parts.

It should be noted that relative arrangements of components and steps, numerical expressions and numerical values set forth in exemplary embodiments are for illustration purpose only and are not intended to limit the present disclosure unless otherwise specified. Techniques, methods and apparatus known to the skilled in the relevant art may not be discussed in detail, but these techniques, methods and apparatus should be considered as a part of the specification, where appropriate.

It should be noted that an electronic device proposed in the present disclosure may be specifically a device having a two-part structure such as a notebook computer. The two-part structure may have a plurality of states. Two parts of the two-part structure may be folded together or opened.

Figure 2:
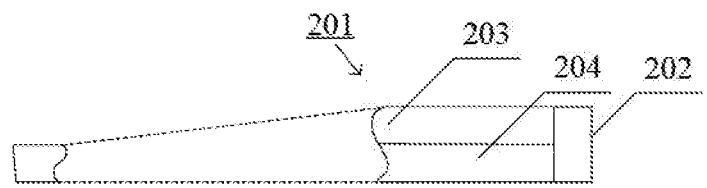
FIG. 2 illustrates a structural schematic of an example of an electronic device according to some embodiments of the present disclosure.

FIG. 2 illustrates a structural schematic of an example of an electronic device according to some embodiments of the present disclosure. As shown in FIG. 2, an electronic device includes a main body 201 and a connecting device 202. The main body 201 includes a first main body 203 and a second main body 204. The connecting device 202 is connected to a first side of the first main body and a second side of the second main body such that the first main body and the second main body may move relative to each other.

A thickness of a first portion of the main body adjacent to the connecting device is greater than a thickness of a second portion of the main body away from the connecting device.

It should be noted that in the electronic device, thicknesses of the two portions of the main body are different. Accordingly, the electronic device may be different from a notebook computer with a monotonous external appearance, and a problem of monotonous external appearance design of a notebook computer may thus be solved.

For example, the connecting device may have a hinge structure to hinge the first main body and the second main body together.

In a specific implementation, the connecting device may be a plugging device. The first main body and the second main body may be plugged together based on the connecting device.

For example, the first side of the first main body may be a rotation axis of the first main body, and the second side of the second main body may serve as a rotation axis of the second main body. Accordingly, the first main body and the second main body are both rotatable, and relative motion between the first main body and the second main body may thus be achieved. In FIG. 2, the first main body and the second main body are adjacent to each other. That is, the notebook computer is in a closed state.

As shown in FIG. 2, the thicknesses of the two portions of the main body are different. For example, the thickness of the first portion adjacent to the connecting device is larger than the thickness of the second portion away from the connecting device.

It should be noted that the thicknesses of the two parts of the main body in the electronic device provided in examples of the electronic device shown in FIG. 2 are different. Accordingly, the electronic device is different from a notebook computer with an external appearance of a flat cuboid with even surfaces. Specific configurations of the two portions of the main body that have different thicknesses are discussed in following embodiments, and are not described in detail here.

It should be noted that the present disclosure does not limit sizes of the two portions of the main body. The two portions of the main body may have a same size, or different sizes.

It should be noted that two concepts "adjacent to" and "away from" related to the present disclosure are relative concepts. The two concepts refer to two portions in a same direction and, for example, in a direction that satisfies a vertical condition with a rotation axis/side. The vertical condition means a vertical direction, or a direction with an angle that is approximately vertical. Specially, the two concepts refer to a distance from a connecting device. A portion closer to the connecting device is a portion adjacent to the connecting device, and a portion farther from the connecting device is a portion away from the connection device.

As such, the example of the electronic device includes a main body including a first main body and a second main body, and a connecting device connected to a first side of the first main body and a second side of the second main body. The first main body and the second main body may move relative to each other. In the main body, a thickness of a first portion adjacent to the connecting device is greater than a thickness of a second portion away from the connecting device. In the electronic device, the thicknesses of the two portions in the main body are different. A structural style of the electronic device is different from a structural style of a conventional notebook computer, and a problem of monotonous external appearance design of a conventional notebook computer may thus be solved.

FIGS. 3-6 illustrate structural schematics of examples of another electronic device according to some embodiments of the present disclosure.

Figure 3:
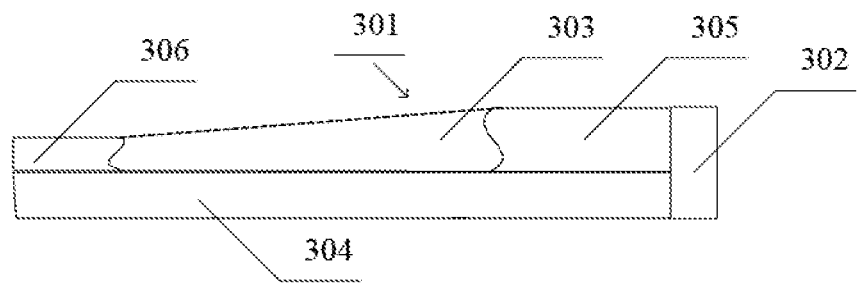
FIGS. 3-6 illustrate structural schematics of examples of another electronic device according to some embodiments of the present disclosure.

As shown in FIG. 3, an electronic device includes a main body 301 and a connecting device 302. The main body 301 includes a first main body 303 and a second main body 304. The connecting device 302 is connected to a first side of the first main body and a second side of the second main body such that the first main body and the second main body may move relative to each other.

The main body includes two portions including a first portion adjacent to the connecting device and a second portion away from the connecting device. A thickness difference between the two portions of the main body may be achieved based on a thickness difference between two portions of the first main body. For example, a thickness of a portion 305 of the first main body adjacent to the connecting device is greater than a thickness of a portion 306 away from the connecting device. Accordingly, a thickness of the first portion of the main body adjacent to the connecting device is greater than a thickness of the second portion of the main body away from the connecting device.

A thickness of the second main body may be approximately consistent, or a portion adjacent to the connecting device may be a little bit thicker than a portion away from the connecting device. Accordingly, for the main body including the first main body and the second main body, the thickness of the first portion adjacent to the connecting device is greater than the thickness of the second portion away from the connecting device.

In some other embodiments, a thickness pattern of the second main body may be opposite to a thickness pattern of the first main body, provided that a thickness change of the first main body is greater than a thickness change of the second main body. Accordingly, for the main body including the first main body and the second main body, the thickness of the first portion is greater than the thickness of the second portion.

Specific implementations of the first main body including two portions with different thicknesses are described in detail later. FIG. 3 only shows that the two portions of the first main body may have different thicknesses.

Figure 4:
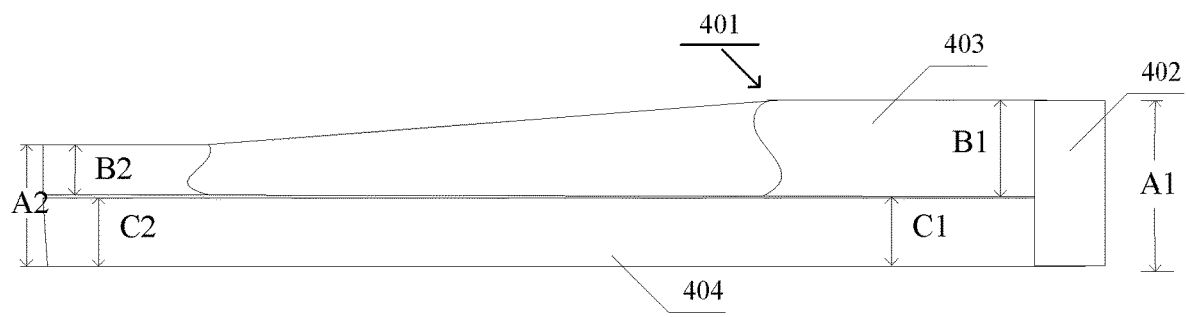

FIG. 4 illustrates another example of an electronic device according to some embodiments of the present disclosure. As shown in FIG. 4, an electronic device includes a main body 401 and a connecting device 402. The main body 401 includes a first main body 403 and a second main body 404.

As shown in FIG. 4, a first portion of the main body has a thickness of A1, and a second portion of the main body has a thickness of A2, where A1>A2. A portion of the first main body adjacent to the connecting device has a thickness of B1, and a portion of the first main body away from the connecting device has a thickness of B2, where B1>B2. A portion of the second main body adjacent to the connecting device has a thickness of C1, and a portion of the second main body away from the connecting device has a thickness of C2.

Accordingly, thickness A1 of the first portion of the main body is given by A1=B1+C1, and thickness A2 of the second portion of the main body is given by A2=B2+C2. The present disclosure does not limit a relationship between C1 and C2. That is, C1 may be greater than, equal to, or smaller than C2, provided that a requirement of A1>A2 is met.

For example, the first main body has a first surface, and the first surface is a surface facing away from the second main body.

Figure 5:

FIG. 5 illustrates another example of an electronic device according to some embodiments of the present disclosure. FIG. 5 illustrates a side view of the first main body 501. The first main body 501 includes a portion 502 adjacent to the connecting device, and a portion 503 away from the connecting device. A first surface 504 corresponding to the portion 502 and the portion 503 has a thickness difference.

Figure 1:
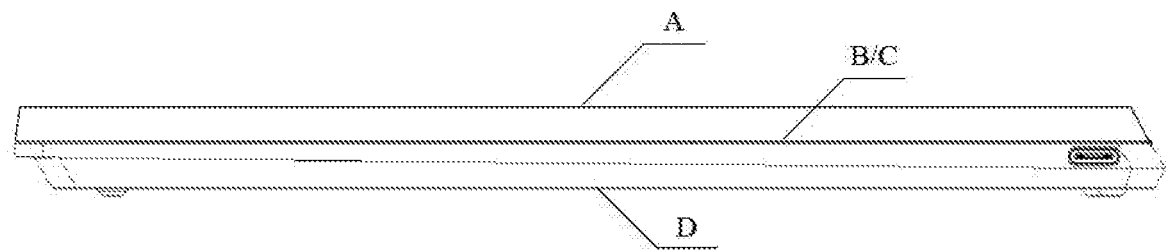
FIG. 1 illustrates a structural schematic of a notebook computer.

For example, in the first main body having a thickness difference, the portion adjacent to the connecting device is adjacent to the portion away from the connecting device. There is a thickness drop between the portion adjacent to the connecting device and the portion away from the connecting device. A thickness drop refers to a non-uniform change between two surfaces with different thicknesses. When a thickness drop appears on the first surface of the first main body (for example, the surface A of the notebook computer as shown in FIG. 1), the thickness drop in the first surface may have a connecting surface, and the connecting surface may have a certain angle with the first surface.

As shown in FIG. 5, the first main body has a thickness difference in the first surface. A region with a larger thickness corresponds to the portion 502, and a region with a smaller thickness corresponds to the portion 503. As shown in FIG. 5, in the first surface, a step structure is formed between the two regions with different thickness, and there is almost no thickness difference within each of the two regions.

The portion 502 in the first main body is a small region in the first main body. As shown in FIG. 5, a step structure with a thickness drop is formed between the portion 502 adjacent to the connecting device and the portion 503 away from the connecting device. In the first main body, a thickness difference only exists between the portion 502 and the portion 503, and within each of the portion 502 and the portion 503, the first surface is smooth and even.

Figure 6:
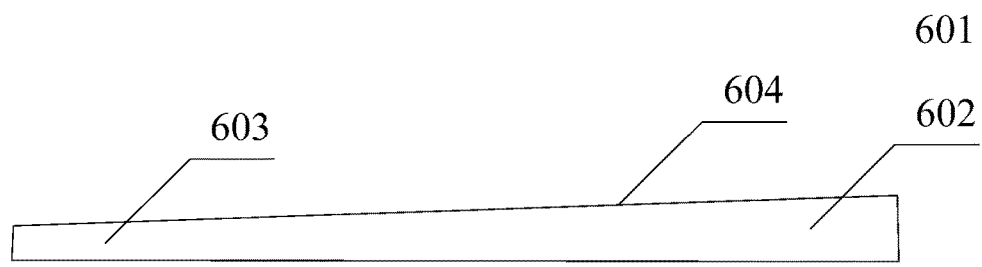

FIG. 6 illustrates another example of an electronic device according to some embodiments of the present disclosure. FIG. 6 illustrates a side view of the first main body 601. The first main body 601 includes a portion 602 adjacent to the connecting device and a portion 603 away from the connecting device. A first surface 604 corresponding to the portion 602 and the portion 603 has a thickness difference. In some embodiments, a connecting device (not illustrated in FIG. 6) may be connected with the first main body 601 and may have a thickness same as a thickness of the portion 602.

For example, in the first main body with a thickness difference, the portion adjacent to the connecting device is separated from the portion away from the connecting device. The thickness difference between the two portions is uniformly distributed along the first surface.

It should be noted that though there is a thickness difference between the two portions of the first main body, the thickness difference may be uniformly distributed. That is, the first surface may still be a smooth surface. Accordingly, a user may convenient hold the notebook computer, and scraping during a carrying process may be reduced.

The portion of the first main body adjacent to the connecting device is located on a first side of the first main body, and the portion of the first main body away from the connecting device is located at a second side of the first main body. The first side and the second side are two opposite sides.

As shown in FIG. 6, the first main body has a thickness difference in the first surface. A region with a larger thickness corresponds to the portion 602, and a region with a smaller thickness corresponds to the portion 603. The two regions with a thickness difference are continuous on the first surface. Accordingly, the thickness difference between the two portions is uniformly distributed in the first surface 604. In FIG. 6, two regions where the two portions are located have a uniform thickness difference, and thus the first surface is a smooth plane.

In FIG. 6, the first main body has a wedge-shaped structure. A region where the portion 602 is located has a large thickness, and a region where the portion 603 is located has a small thickness.

For example, the electronic device further includes a first display device. The first main body has a second surface, and the second surface faces the second main body. The second surface is opposite to the first surface, and the second surface exposes a display component of the first display device. A processing circuit of the first display device is disposed in the portion adjacent to the connecting device, and the processing circuit and the display component are arranged overlapping with each other in a display direction.

It should be noted that, in a conventional notebook computer as shown in FIG. 1, a part including surfaces A and B does not have a wedge structure. In the surface B, because screen-related circuits are disposed in a frame at a lower side of a screen, the frame at the lower side of the screen is much wider than frames at left, right and upper sides of the screen. Accordingly, visual experience of a user may be undesirable.

As such, in the examples shown in FIGS. 3-6, a first display device is disposed in a first main body of the electronic device, and a processing circuit and a light-emitting component of the first display device are arranged overlapping with each other. The processing circuit may be disposed in a region having a larger thickness in the first main body, and a lower frame of the light-emitting component (corresponding to a display screen) may thus be narrowed.

It should be noted that after the processing circuit is disposed in the second main body (such as a part including surfaces C and D in FIG. 1), a routing problem may be involved. Further, increasing an overall thickness of the first main body may result in a wasted space. Accordingly, as illustrated in the examples of FIGS. 2-6, a thickness of a portion of the first main body is increased, and the processing circuit related to the screen is disposed in the portion with an increased thickness.

In a specific implementation, in the first main body, a size of the portion with an increased thickness (e.g., the first portion with a larger thickness adjacent to the connecting device) matches a size of the processing circuit. Accordingly, the step structure may be minimized, or an angle of a uniform slope may be minimized.

Figure 7:
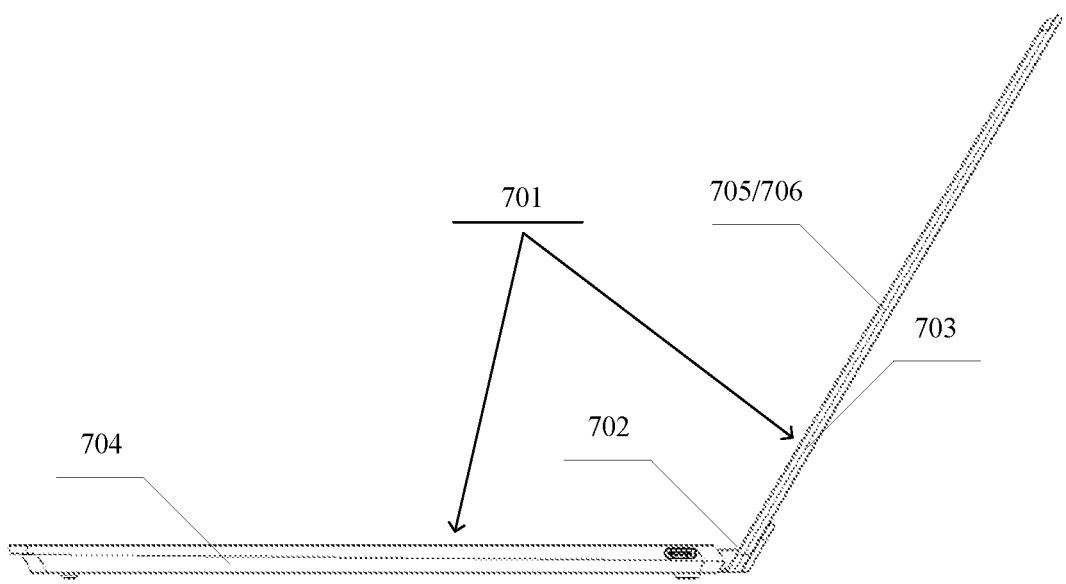
FIG. 7 illustrates a structural schematic of a side view of an example of an electronic device according to some embodiments of the present disclosure.

FIG. 7 illustrates a structural schematic of a side view of an example of an electronic device according to some embodiments of the present disclosure.

As shown in FIG. 7, the electronic device includes a main body 701 and a connecting device 702. The main body 701 includes a first main body 703 and a second main body 704. The first main body 703 and the second main body 704 may be opened based on the connecting device 702, and there is an angle between the first main body 703 and the second main body 704. A light-emitting component 706 (display screen) of a first display device is exposed in the second surface 705 of the first main body. A processing circuit 707 of the first display device is disposed in a portion of the first main body 703 adjacent to the connecting device 702. The processing circuit 707 and the light-emitting component 706 are arranged overlapping with each other in a display direction.

When the electronic device is a notebook computer, the light-emitting component of the first display device in the first main body is specifically a display screen disposed on the surface B of the notebook computer. As a display screen, the light-emitting component may display various information to be displayed in the notebook computer.

For example, the processing circuit of the first display device is a Printed Circuit Board (PCB) of the display screen in the surface B of the notebook computer.

As such, in an electronic device provided by the examples of electronic device shown in FIGS. 3-7, a thickness of a portion of a first main body adjacent to a connecting device is greater than a thickness of a portion of the first main body away from the connecting device. The portion of the first main body adjacent to the connecting device is disposed with a processing circuit of a first display device, and a second surface of the first main body is correspondingly disposed with a light-emitting component of the processing circuit. The processing circuit and the light-emitting component are arranged overlapping with each other in a display direction, and thus the electronic device does not need to set a dedicated region near the display screen for the processing circuit. Accordingly, a lower frame of a display screen corresponding to the light-emitting component in the second surface of the electronic device may be narrowed, and thereby user's visual experiences may be improved.

Figure 8:
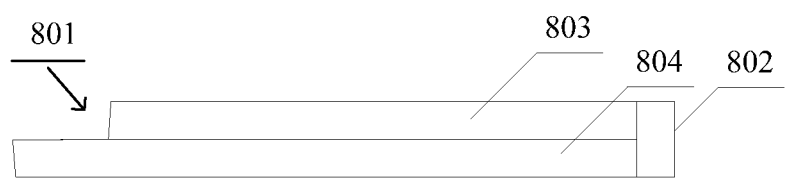
FIGS. 8-9 illustrate structural schematics of an example of another electronic device according to some embodiments of the present disclosure.
Figure 9:
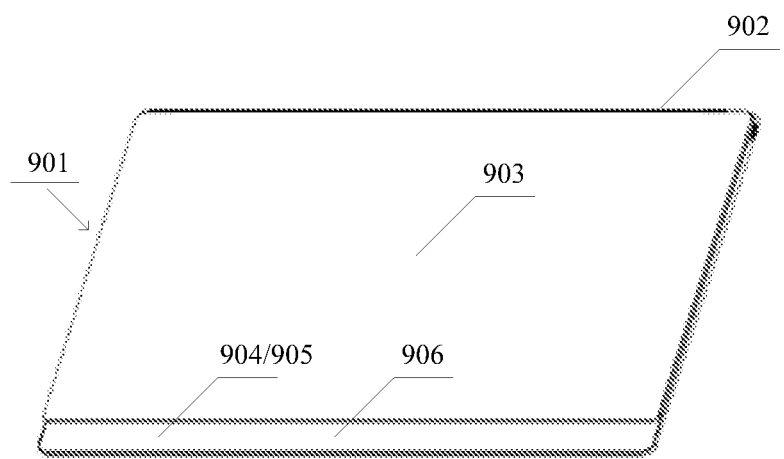

FIGS. 8-9 illustrate structural schematics of an example of another electronic device according to some embodiments of the present disclosure.

As shown in FIG. 8, an electronic device includes a main body 801 and a connecting device 802. The main body 801 includes a first main body 803 and a second main body 804. The connecting device 802 is connected to a first side of the first main body and a second side of the second main body such that the first main body and the second main body may move relative to each other.

A thickness of a first portion of the main body adjacent to the connecting device is greater than a thickness of a second portion of the main body away from the connecting device. For example, the first main body 803 and the second main body 804 have different sizes. The thickness of the first portion corresponds to a sum of a thickness of the first main body and a thickness of the second main body, and the thickness of the second portion corresponds to the thickness of the second main body.

FIG. 8 illustrates a side view of the electronic device. As shown in FIG. 8, the first main body and the second main body are closed together. That is, the notebook computer is in a closed state.

The first main body and the second main body are rotatably connected based on the connecting device. The first main body has a second surface, and the second main body has a third surface. The second surface faces the second main body, and the third surface faces the first main body. When the second surface is opposite to the third surface, a thickness of the second portion corresponds to a thickness of the second main body.

From a side view of the electronic device, when the second surface and the third surface are opposite, that is, the notebook computer is in a closed state, a length of the first main body is smaller than a length of the second main body. Accordingly, a portion of the second main body is not covered by the first main body. Thus, there is a thickness drop between the first main body and the second main body.

A thickness drop refers to a non-uniform change between two surfaces with different thicknesses. When a thickness drop appears between the first main body and the second main body, there is a logical connecting surface (there is no actual connecting surface) between the second surface of the first main body and the third surface of the second main body. The logical connecting surface makes an angle with the second surface and the third surface.

The electronic device further includes a second display device. For example, a display component of the second display device is disposed on the third surface of the second main body. The third surface of the second main body faces the second surface of the first main body. The second portion exposes the display component of the second display device. For example, the second portion at least partially exposes the display component. The second portion may fully reveal the display component, or may partially reveal the display component.

As shown in FIG. 9, an electronic device includes a main body 901 and a connecting device 902. The main body 901 includes a first main body 903 and a second main body 904. The connecting device 902 is connected to a first side of the first main body and a second side of the second main body such that the first main body and the second main body may move relative to each other. A light-emitting component 906 of a second display device is disposed in a first surface 905 of the second main body, and the light-emitting component 906 is not covered by the first main body 903. When a second surface of the first main body is adjacent to a first surface of the second main body, that is, when the electronic device is in a closed state, information displayed in the light-emitting component 906 of the second display device may still be visually perceived by a user.

The second display device may be configured to display some information of the electronic device, such as system information including time, connection status with an external device, and execution progress of an original task operating in the electronic device, new information of social applications, and weather, etc. Contents displayed in the second display device may be read without opening the first main body. Accordingly, time for flipping the first main body may be saved, and efficiency may thus be improved.

When the electronic device is a notebook computer, the light-emitting component of the second display device in the second main body is specifically a display screen disposed on the surface C of the notebook computer. For example, when an external device is connected to the electronic device via Bluetooth, an icon indicating a Bluetooth connection status may be displayed on the display screen disposed on the surface C of the notebook computer.

In a specific implementation, the light-emitting component of the second display device may be a Liquid Crystal Display (LCD) screen, an E ink screen with low power consumption, or an Organic Light-Emitting Diode (OLED).

The electronic device may further include a sensing device, and the sensing device may have a size smaller than a size of the light-emitting component of the second display device. In a specific implementation, the sensing device may be disposed overlapping the light-emitting component of the second display device. For example, when the size of the sensing device is smaller than the size of the light-emitting component of the second display device, the sensing device may be disposed in a middle region of the light-emitting component.

Figure 10:
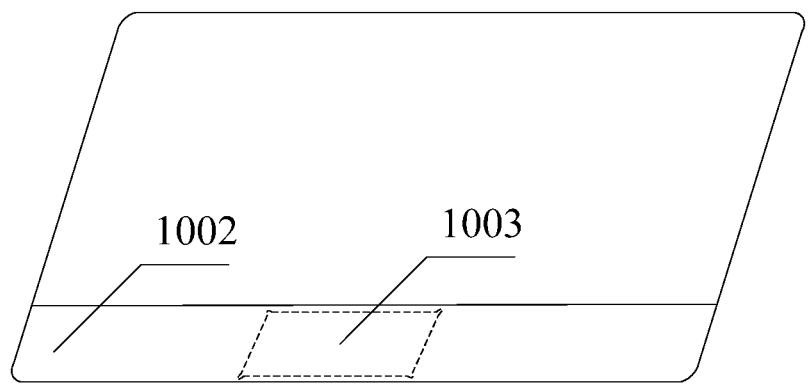
FIG. 10 illustrates a structural schematic of an example of a second main body of the electronic device in FIGS. 8-9 according to some embodiments of the present disclosure.

FIG. 10 illustrates a structure of a second main body in the electronic device as shown in FIGS. 8-9 according to some embodiments of the present disclosure. FIG. 10 illustrates a top view of the second main body. As shown in FIG. 10, a first surface of the second main body 1001 is disposed with a light-emitting component 1002 of a second display device, and is further disposed with a sensing device 1003. The sensing device 1003 has a size smaller than a size of the light-emitting component 1002. The sensing device 1003 is disposed overlapping the light-emitting component 1002. A user may perform a sensing operation based on the sensing device 1003.

In a specific implementation, display contents of the second display device may be different from display contents of the first display device, or a part of the display contents of the first display device may be displayed on the second display device.

It should be noted that, when the first main body and the second main body are closed together, the second display device may display contents, and a user may control the second display device. When the first main body and the second main body are opened, a user may control the first display device, and the second display device may be set to display or not to display according to actual situations.

The first display device and the second display device may be controlled through the sensing device. For example, when the first main body and the second main body are opened, the sensing device disposed overlapping the second display device may be used as a touch panel. With the touch panel, a cursor in the first display device may be controlled according to a user's operation, or a user may perform an input gesture operation.

In a specific implementation, after the electronic device is powered on, the second display device may be turned on for display.

In a specific implementation, by operating on the sensing device, a user may control information displayed in the second display device, or may switch between the first display device and the second display device.

In a specific implementation, the sensing device may be an ordinary touch sensing device. That is, the sensing device may sense a touch operation by a user. The sensing device may include a fingerprint recognition function. That is, the sensing device may identify a fingerprint of a user.

As such, in an electronic device provided by the examples of electronic device shown in FIGS. 8-10, a first main body and a second main body have different sizes. Accordingly, a thickness of a first portion corresponds to a sum of a thickness of the first main body and a thickness of the second main body, and a thickness of the second portion corresponds to a thickness of the second main body. The first main body and the second main body are rotatably connected based on a connecting device. The first main body has a second surface, and the second main body has a third surface. The second surface facers the second main body, and the third surface faces the first main body. When the second surface is opposite to the third surface, the thickness of the second portion corresponds to a thickness of the second main body. A display component of a second display device is disposed on the third surface of the second main body, and the third surface of the second main body faces the second surface of the first main body. The second portion exposes the display component of the second display device. In the electronic device, the first main body is smaller than the second main body, and thus a part of the second main body is not covered by the first main body. The second display device is disposed in the second main body, and contents may be displayed based on the part of the second main body that is not covered by the first main body. Accordingly, when the first main body and the second main body of the electronic device are closed together, information may be displayed based on the second display device, and may be conveniently read by a user.

Figure 11:
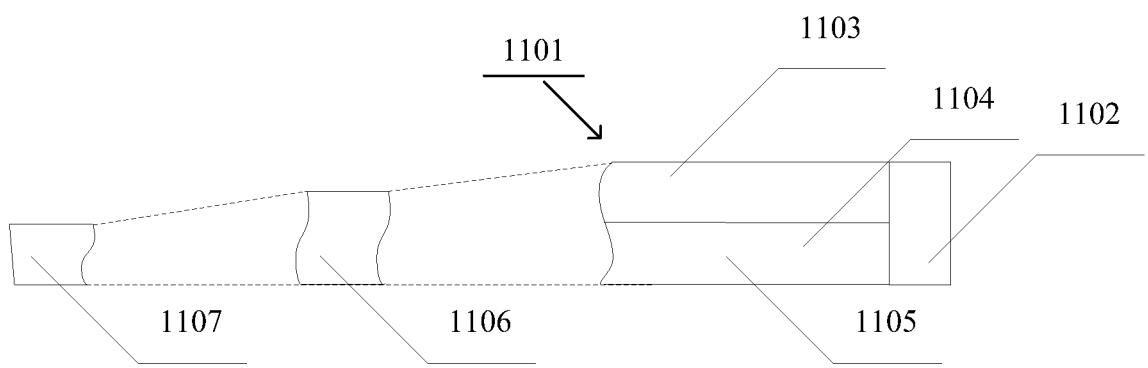
FIG. 11 illustrates a structural schematic of an example of another electronic device according to some embodiments of the present disclosure.

FIG. 11 illustrates a structural schematic of an example of another electronic device according to some embodiments of the present disclosure. As shown in FIG. 11, an electronic device includes a main body 1101 and a connecting device 1102. The main body 1101 includes a first main body 1103 and a second main body 1104. The connecting device 1102 is connected to a first side of the first main body and a second side of the second main body such that the first main body and the second main body may move relative to each other.

As shown in FIG. 11, the main body includes three portions sequentially arranged in a direction from an end of the main body adjacent to the connecting device to an end of the main body away from the connecting device. The three portions are a first portion 1105, a second portion 1106 and a third portion 1107, respectively. Accordingly, the first portion 1105 is a portion adjacent to the connecting device, and the third portion is a portion away from the connecting device. A thickness of the first portion 1105 is greater than a thickness of the third portion 1107.

A thickness difference between the two portions 1105 and 1107 of the main body may be achieved by thickness differences of three portions of the main body. For example, the thickness of the first portion 1105 of the main body is greater than a thickness of the second portion 1106 of the main body, and the thickness of the second portion 1106 of the main body is greater than the thickness of the third portion 1107 of the main body.

A first distance is between the first portion and the connecting device. A second distance is between the second portion and the connecting device. A third distance is between the third portion and the connecting device. The first distance is less than the second distance, and the second distance is less than the third distance.

A thickness difference between the first portion and the second portion, and a thickness difference between the second portion and the third portion may appear in a form of a thickness drop or uniform decrease. For example, there is a thickness drop between the first portion and the second portion, and there is a thickness drop between the second portion and the third portion; or thicknesses of the first portion and the second portion uniformly decrease, and there is a thickness drop between the second portion and the third portion; or thicknesses of the first portion and the second portion uniformly decrease, and thicknesses of the second portion and the third portion uniformly decrease; or there is a thickness drop between the first portion and the second portion, and thicknesses of the second portion and the third portion uniformly decrease.

Figure 12:
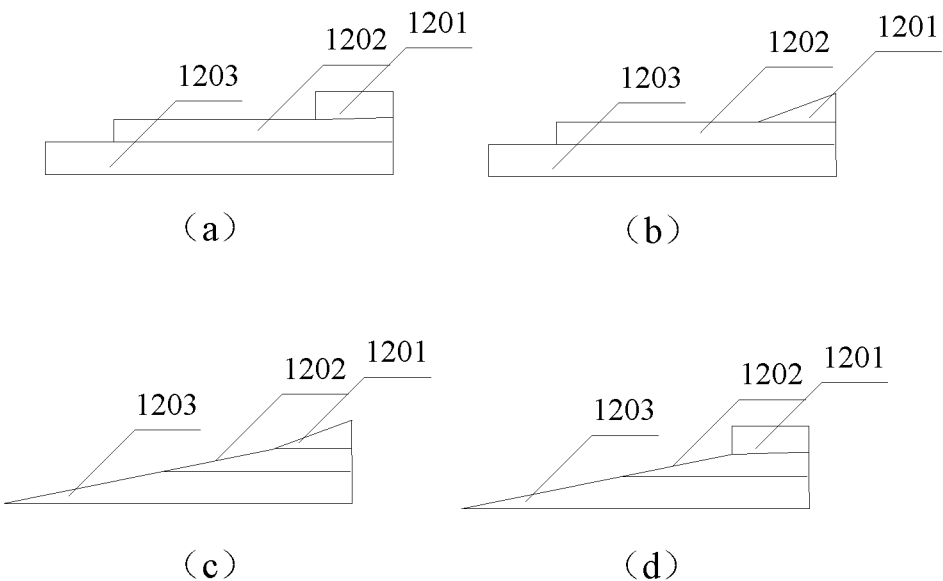
FIG. 12 (*a*)-(*d*) illustrate structural schematics of examples of a main body in another electronic device according to some embodiments of the present disclosure.

FIGS. 12 (a)-(d) illustrate structural schematics of examples of a main body in another electronic device according to some embodiments of the present disclosure.

The main body includes a first portion 1201, a second portion 1202 and a third portion 1203. FIG. 12 (*a*)-(*d*) illustrate four configurations of the main body as examples. FIG. 12 (*a*) illustrates a configuration where there is a thickness drop between the first portion and the second portion, and there is a thickness drop between the second portion and the third portion. FIG. 12 (*b*) illustrates a configuration where thicknesses of the first portion and the second portion uniformly decrease, and there is a thickness drop between the second portion and the third portion. FIG. 12 (*c*) illustrates a configuration where the thicknesses of the first portion and the second portion uniformly decrease, and thicknesses of the second portion and the third portion uniformly decrease. FIG. 12 (*d*) illustrates a configuration where there is a thickness drop between the first portion and the second portion, and the thicknesses of the second portion and the third portion uniformly decrease.

The electronic device further includes two display devices including a first display device and a second display device.

The thickness difference between the first portion and the second portion is caused by disposing a processing circuit of the first display device in the first portion, and the thickness difference may appear in a form of uniform decrease or a thickness drop.

The second portion and the third portion are caused by a size difference between the first main body and the second main body, and the second display device is exposed. For example, the second portion belongs to the first main body, and the third portion belongs to the second main body. Thus, there is a height difference between the first main body and the second main body.

A first distance is between the first portion and the connecting device. A second distance is between the second portion and the connecting device. A third distance is between the third portion and the connecting device have. The first distance is smaller than the second distance, and the second distance is smaller than the third distance. Accordingly, the distance between the second portion and the connecting device and the distance between the third portion and the connection device are different. That is, the third portion is not covered by the second portion, and the second display device may thus be exposed.

Figure 13:
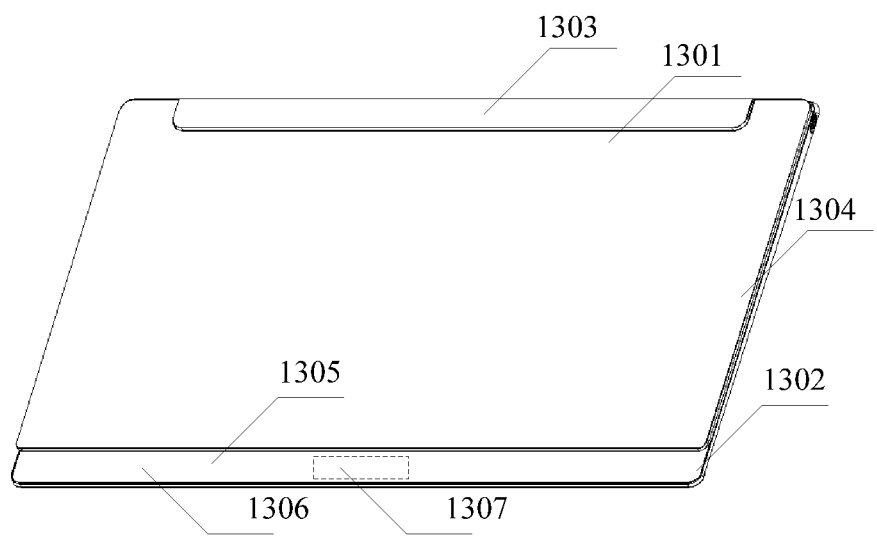
FIGS. 13-15 illustrate structural schematics of examples of another electronic device according to some embodiments of the present disclosure.
Figure 14:
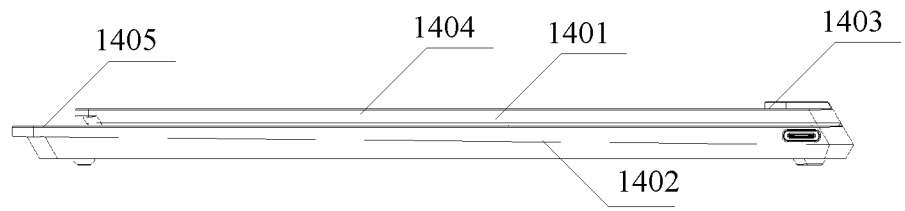
Figure 15:
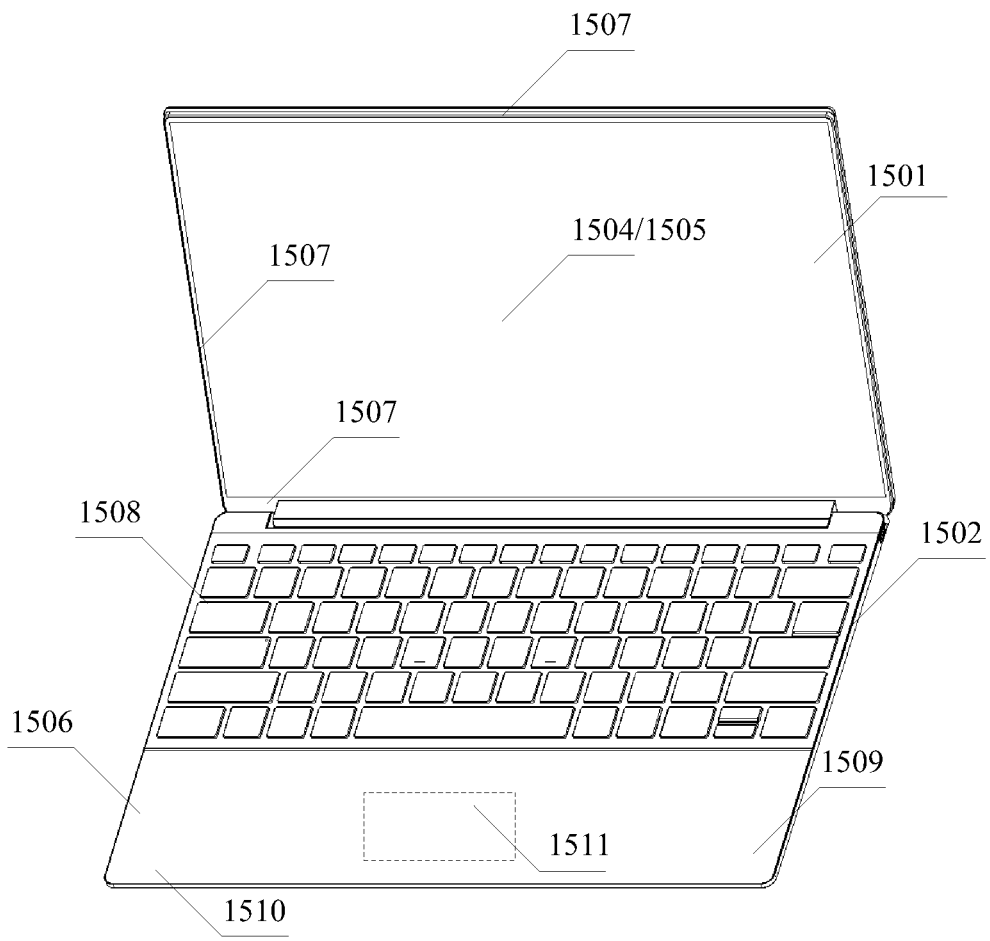

FIGS. 13-15 illustrate structural schematics of examples of another electronic device according to some embodiments of the present disclosure. FIG. 13 illustrates a top view of the main body. As shown in FIG. 13, the main body includes a first main body 1301 and a second main body 1302. The first main body 1301 includes a first portion 1303 and a second portion 1304, and the second main body includes a third portion 1305.

There is a thickness difference between the first portion 1303 and the second portion 1304, and the thickness difference appears in a form of a thickness drop. There is also a thickness difference between the second portion and the third portion, and the thickness difference also appears in a form of a thickness drop.

A second display device 1306 is disposed in the third portion 1305, and a sensing device 1307 and the second display device are arranged overlapping with each other. A size of the sensing device is smaller than a size of a light-emitting component of the second display device.

FIG. 14 illustrates a side view of the main body. The main body includes a first main body 1401 and a second main body 1402. The first main body 1401 includes a first portion 1403 and a second portion 1404, and the second main body 1402 includes a third portion 1405.

A thickness difference is between the first portion 1403 and the second portion 1404, and the thickness difference appears in a form of a thickness drop. A thickness difference is between the second portion 1404 and the third portion 1405, and the thickness difference also appears in the form of a thickness drop.

In structures shown in FIGS. 13-14, the thickness difference between the first portion and the second portion and the thickness difference between the second portion and the third portion appear in form of a thickness drop. The present disclosure does not limit patterns of the thickness difference.

In a specific implementation, the thickness difference between the first portion and the second portion is approximately 1.8 mm.

FIG. 15 illustrates a front view of the main body. The main body includes a first main body 1501 and a second main body 1502. A second surface 1504 of the first main body is disposed with a first display device 1505, and the second main body includes a third portion 1506. A uniform frame 1507 is disposed at a periphery of the first display device 1505.

The first surface of the second main body 1502 includes a first area 1508 and a second area 1509. A keyboard is disposed in the first area 1502. The second area 1509 is a palm rest position in the surface C of the electronic device. The second area 1509 is disposed with a second display device 1510 and sensing device 1511.

In a specific implementation, the frame 1507 has a width of approximately 2.7 mm.

As such, in an electronic device provided by the examples of electronic device shown in FIGS. 12-15, a thickness of a first portion of a main body is greater than a thickness of a second portion of the main body, and the thickness of the second portion of the main body is greater than a thickness of a third portion of the main body. A first distance is between the first portion and a connecting device. A second distance is between the second portion and the connecting device. A third distance is between the third portion and the connecting device. The first distance is less than the second distance, and the second distance is less than the third distance. A thickness difference between the first portion and the second portion is caused by setting a processing circuit of a first display device, and the thickness difference may appear in a form of uniform decrease or a thickness drop. The second portion and the third portion are caused by a size difference between a first main body and a second main body, and a second display device is exposed. In this solution, the main body has three portions with different thicknesses, and a distance difference is between two adjacent portions. Accordingly, a processing circuit of the first display device may be disposed in an additional space due to an increase of a thickness of the first portion, and thus a bottom frame of the first display device in the first main body may be narrowed. Due to the thickness difference and a distance between the second portion and the third portion, the second display device may be exposed. Accordingly, a user may conveniently and quickly read contents displayed in the second display device without opening the first main body and the second main body.

The embodiments disclosed in the present disclosure are described in a progressive manner. Each embodiment focuses on differences from other embodiments, and same and similar parts in the embodiments may be referred to each other.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this disclosure, such other modifications, equivalents, or improvements to the disclosed embodiments are intended to be encompassed within the scope of the present disclosure.

What is claimed is:

1. An electronic device, comprising:
a main body, including a first main body and a second main body, the first main body having a second surface facing a first surface of the second main body, and the second surface being disposed with a light emitting component of a display device;
a connecting device, connected to a first side of the first main body and a second side of the second main body such that the first main body and the second main body are movable relative to each other;
wherein:
the first main body includes a first portion adjacent to the connecting device and a second portion away from the connecting device, wherein the first portion is disposed with a processing circuit overlapping with the light-emitting component along the second surface;
and
a thickness of the first portion is greater than a thickness of the second portion.

2. The device according to claim 1, wherein:
in the first main body, the first portion is adjacent to the second portion, and a thickness drop is between the first portion and the second portion.

3. The device according to claim 1, wherein:
the first main body includes a first surface facing away from the second main body, and
in the first main body, the first portion is separated from second portion, and a thickness difference between the two portions is uniformly distributed along the first surface.

4. The device according to claim 1, wherein:
the first main body and the second main body have different sizes,
the thickness of a first portion of the main body adjacent to the connecting device corresponds to a sum of a thickness of the first portion of main body and a thickness of the second main body, and
the thickness of a second portion of the main body, being away from the connecting device, corresponds to the thickness of the second main body.

5. The device according to claim 4, wherein:
the first main body and the second main body are rotatably connected based on the connecting device,
the first main body includes a second surface facing toward the second main body, and the second main body includes a third surface facing toward the second surface of the first main body, and
when the second surface is opposite to the third surface, a thickness of the second portion of the main body corresponds to a thickness of the second main body.

6. The device according to claim 5, further comprising a second display device,
wherein:
a display component of the second display device is disposed on the third surface of the second main body,
the third surface of the second main body faces toward the second surface of the first main body, and
the second portion exposes the display component of the second display device.

7. The device according to claim 6, further comprising:
a sensing device with a size smaller than a size of the display component of the second display device.

8. The device according to claim 1,
wherein:
the main body further includes a first portion, a second portion and a third portion, sequentially arranged in a direction from an end of the main body adjacent to the connecting device to an end of the main body away from the connecting device, and the first portion is adjacent to the connecting device;
a thickness of the first portion is greater than a thickness of the second portion, and the thickness of the second portion is greater than a thickness of the third portion; and
a first distance is between the first portion and the connecting device, a second distance is between the second portion and the connecting device, and a third distance is between the third portion and the connecting device, wherein the first distance is less than the second distance, and the second distance is less than the third distance.

9. The device according to claim 8, wherein:
a thickness drop is between the first portion and the second portion, and a thickness drop is between the second portion and the third portion, or
a thickness of each of the first portion and the second portion uniformly decreases, and a thickness drop is between the second portion and the third portion, or
the thickness of each of the first portion and the second portion uniformly decreases, and a thickness of each of the second portion and the third portion uniformly decreases, or
a thickness drop is between the first portion and the second portion, and the thickness of each of the second portion and the third portion uniformly decreases.

10. The device according to claim 9, further comprising a first display device and
a second display device, wherein:
a thickness difference between the first portion and the second portion is caused by disposing a processing circuit of the first display device in the first portion, and the thickness difference appears in a form of uniform decrease or a thickness drop, and
the second portion and the third portion are caused by a size difference between the first main body and the second main body to expose the second display device.

11. The device according to claim 10, further comprising:
a sensing device with a size smaller than a size of a display component of the second display device.

* * * * *